April 20, 1937.  R. J. GITS  2,077,880
LUBRICATING MECHANISM
Filed Aug. 15, 1933
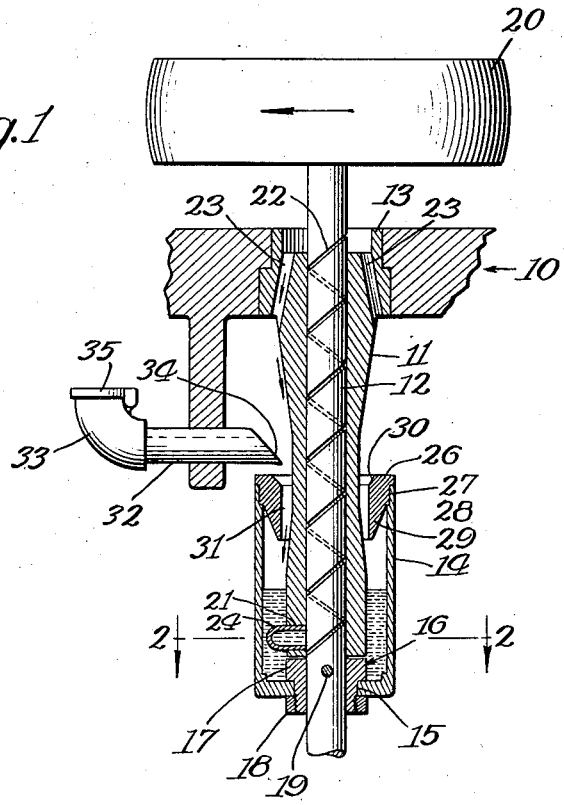
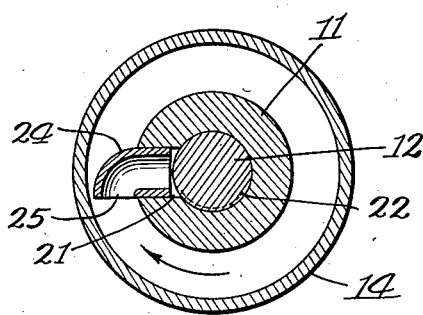
Inventor.
Remi J. Gits
By Gillson, Mann & Co
Attys.

Patented Apr. 20, 1937

2,077,880

UNITED STATES PATENT OFFICE 2,077,880

LUBRICATING MECHANISM

Remi J. Gits, Riverside, Ill.

Application August 15, 1933, Serial No. 685,274

3 Claims. (Cl. 308—134.1)

This invention relates to lubrication mechanism, and, more particularly, to automatically operated lubricating devices.

One of the objects of the invention is the provision of a new and improved lubricator having novel means for circulating lubricant supplied to a bearing.

Another object of the invention is the provision of a new and improved lubricator having means associated with an upwardly extending shaft for continuously supplying lubricant to the bearing of said shaft without the use of packing to prevent the escape of the lubricant.

A still further object of the invention is the provision of new and improved means for lubricating the bearing of a vertical rotating shaft.

Another object of the invention is the provision of a new and improved lubricating device which is simple in construction, inexpensive to manufacture, efficient in use and one that operates automatically to continuously supply a change of lubricant to the bearing of a movable element.

Other and further objects and advantages of the invention will appear from the following, taken in connection with the accompanying drawing, in which—

Fig. 1 is a vertical section of a portion of a motor showing the invention in position thereon with parts broken away; and Fig. 2 is a section on the line 2—2 of Fig. 1.

In lubricating the bearings of vertical shafts, considerable difficulty has heretofore been experienced due to the fact that the lubricant tends to drain downward from the bearing by the action of gravity. In order to prevent loss of lubricant, it is common practice to provide packing about the shaft below the bearing, but this is objectionable for the reason that in order that the packing be oil-proof, it must be compressed so tightly about the shaft as to interfere to a certain extent with its rotation.

The present invention seeks to remedy these difficulties whereby packing is unnecessary and the lubricant is recirculated through the bearing.

Referring now to the drawing, the reference character 10 designates a casing which may be of any suitable mechanism but which, for convenience of description, will be referred to as a motor casing having the bearing 11 for one end of the motor or armature shaft 12. This bearing is rigidly attached to the casing, as by making it a press fit. The upper end of the shaft 12 may be provided with a pulley 20, as is usual in such constructions. The bearing 11 has an oil receptacle 13 in its upper end for receiving the excess oil elevated by the shaft 12, as will presently appear.

An oil reservoir 14 is attached to the shaft 12 in any suitable manner. The reservoir 14 has an opening 15 in its lower end through which the shaft 12 extends. A hollow bushing 16 extends downwardly through the opening 15 and is threaded on its lower end, the upper end being provided with a head 17 which seats on the bottom wall of the reservoir. A nut 18 is adapted to clamp the bushing 16 in position to form an oil-tight joint. The shaft 12 extends axially through the bushing and is rigidly secured to the shaft by a pin 19 which causes the bushing 16, and with it the reservoir 14, to rotate with the shaft.

The reservoir 14 is adapted to contain a lubricant as oil or the like. The lower end of the bearing 11 is provided with a transverse opening 21 through which the oil from the reservoir passes to the bearing. In order to oil the bearing throughout its length, a spiral groove 22 is cut in the periphery of the shaft 12 in such a direction that its rotation will cause the oil to be elevated along the bearing and any excess will be collected in the receptacle 13 from which it is returned to the reservoir 14 through one or more passages 23 extending downwardly and outwardly to the surface of the bearing 11. The bearing 11 may be tapered inwardly toward the reservoir so as to provide ample space between the bearing and the side walls of the reservoir for the oil to flow downward along the bearing into said reservoir.

Suitable means are provided for directing the oil into the passage 21. A scoop or deflector 24 is employed for this purpose. This deflector has its inner end secured in the opening 21. It is hollow and has an opening 25 directed in the opposite direction from the rotation of the shaft whereby the oil in the reservoir will be scooped up by the scoop as it rotates with the reservoir and will be deflected onto the rotating shaft through the opening 21. The rotation of the shaft in turn will cause the oil to be elevated by the spiral groove due to the frictional resistance between the oil and bearing.

Appropriate means are provided for preventing the oil contained in the reservoir 14 from being discharged by centrifugal force from said reservoir. In the form of construction shown, a cap member 26 is employed for this purpose. This cap member is provided with a reduced portion 27 for engaging in an internal rabbet 28 in the upper end of the reservoir 14. The cap member 26 may be secured in position in any suitable manner, such as by a press fit. The lower end of the cap 26 is tapered inwardly, as at 29, whereby when the oil is caused by centrifugal force to flow upwardly along the wall of the reservoir 14, it will be prevented from being discharged from the reservoir by this tapered portion which will direct the oil back into the reservoir. The cap 26 has an enlarged axial opening 31 through which the bearing 11 extends. The opening is larger in diameter than the bearing whereby oil flowing through the passages 23 and along the tapered walls of the bearing 11 will pass through into the reservoir 14. The opening 31 is flared outwardly at its upper end, as at 30.

If desired, means may be provided for conducting oil to the reservoir for refilling the same. In the construction shown, this means comprises a pipe 32 having an elbow 33 opening upwardly attached to the outer end thereof. The inner end of the pipe 32 terminates above the cap 26 and said cap is provided with a bevelled surface 34 for conducting oil falling thereon from the pipe through the opening 31 into the reservoir. If desired, the elbow 33 may be provided with a hinged cap or closure 35.

In the operation of the device, the shaft is rotated in the direction of the arrows, shown on drawing which in turn will carry the reservoir 14 and the oil contained therein. The rotating oil will be caught by the open end 25 of the oil scoop 24, which will direct the oil onto the shaft. The oil will be elevated by the spiral 22 for oiling the bearing and the surplus will collect in the receptacle 13. From the receptacle 13 the oil is returned to the reservoir 14 by flowing downwardly through the passages 23 onto the tapered surface of the bearing 11 and through the passage or opening 31.

It will thus be seen that means are provided for efficiently lubricating an upstanding bearing without the necessity of employing packing to prevent the loss of lubricant. Furthermore, it is only necessary to supply the lubricant at long intervals of time since none of the lubricant is lost and the same is continuously recirculated along the shaft and bearing. When the lubricant becomes contaminated, it is removed and a fresh supply provided by pouring same into the reservoir or the lubricant may be poured gradually into the receptacle.

It is thought from the foregoing taken in connection with the accompanying drawing that the construction and operation of my device will be apparent to those skilled in the art and that changes in size, shape, proportion and details of construction may be made without departing from the spirit and scope of the appended claims.

I claim as my invention:

1. In combination, a rotatable shaft member, an upstanding elongated bearing member for said shaft member, one of said members having a reservoir attached thereto and extending over the lower portion only of said bearing, the other member having an oil scoop attached thereto within said reservoir and extending outwardly beyond the periphery of the bearing, one of said members having a helical groove extending upwardly from said scoop and in communication therewith, said groove being located between said members and extending upwardly in a direction to cause oil brought in contact with said scoop by the relative rotation of said scoop and reservoir to travel upwardly along said groove during the normal operation of said shaft and a passage for conducting the oil discharged from said groove downwardly along the exterior of said bearing member toward said reservoir, an inwardly and downwardly tapering annular cap for the reservoir surrounding and being spaced from the bearing member, whereby oil forced upwardly in the reservoir will be deflected downwardly and oil flowing down the outer surface of the bearing member may freely enter the reservoir.

2. In combination, an upright shaft, a stationary bearing for said shaft, a receptacle at the upper end of said bearing, a reservoir secured to said shaft adjacent to the lower end of said bearing and extending upwardly about the same and rotating therewith, a cap for said reservoir, said cap extending about said shaft and having a tapered lower end, a scoop secured to said bearing adjacent to the bottom wall of said reservoir and having an opening in its side wall directed opposite to the direction of rotation of said shaft for collecting oil from said reservoir and conducting the same to said bearing, said shaft having a helical groove extending about the same and ascending in the direction opposite to the rotation of the shaft during its normal operation for conducting oil upwardly along said shaft from said reservoir through said bearing into said receptacle, and passages for conducting oil from said receptacle to the exterior of said bearing whereby the same will flow downwardly along the same into said reservoir.

3. In combination, a rotatable shaft, an upstanding bearing for said shaft, said bearing having a continuous, smooth inner surface and having a reduced intermediate portion, a reservoir secured to said shaft below said bearing and extending upwardly around the lower end of the same, a cap secured to the upper portion of said reservoir and surrounding the said reduced portion and spaced therefrom, said cap having a downwardly and inwardly tapered portion, means including a scoop for delivering oil to said shaft adjacent to the lower portion of said reservoir, means including a helical passage extending around said shaft and ascending in the direction opposite to the rotation of said shaft during its normal operation for conducting oil delivered to the same by said scoop along said shaft for lubricating said bearing, and means including a channel and said reduced portion for conducting oil to said reservoir from said shaft.

REMI J. GITS.